(12) United States Patent
Leung et al.

(10) Patent No.: US 6,765,892 B1
(45) Date of Patent: Jul. 20, 2004

(54) OPTIMIZING IP MULTICAST DATA TRANSMISSION IN A MOBILE IP ENVIRONMENT

(75) Inventors: Kent K. Leung, Mountain View, CA (US); Gopal K. Dommety, Santa Clara, CA (US)

(73) Assignee: Cisco Technology, Inc., San Jose, CA (US)

(*) Notice: Subject to any disclaimer, the term of this patent is extended or adjusted under 35 U.S.C. 154(b) by 658 days.

(21) Appl. No.: 09/603,808

(22) Filed: Jun. 26, 2000

(51) Int. Cl.[7] ............................................. H04Q 7/00
(52) U.S. Cl. ....................................... 370/332; 370/312
(58) Field of Search ................................ 370/310, 312, 370/328, 331, 338, 351–356, 432, 401, 402, 390; 455/432.1, 433, 435.1, 436, 437, 439

(56) References Cited

U.S. PATENT DOCUMENTS

| | | | |
|---|---|---|---|
| 4,692,918 A | | 9/1987 | Elliott et al. |
| 5,016,244 A | | 5/1991 | Massey, Jr. et al. |
| 5,018,133 A | | 5/1991 | Tsukakoshi et al. |
| 5,218,600 A | | 6/1993 | Schenkyr et al. |
| 5,371,852 A | | 12/1994 | Attanasio et al. |
| 5,473,599 A | | 12/1995 | Li et al. |
| 5,572,528 A | | 11/1996 | Shuen |
| 5,619,552 A | | 4/1997 | Karppanen et al. |
| 5,729,537 A | | 3/1998 | Billström |
| 5,825,759 A | | 10/1998 | Liu |
| 5,862,345 A | | 1/1999 | Okanoue et al. |
| 6,078,575 A | | 6/2000 | Dommety et al. |
| 6,141,347 A | * | 10/2000 | Shaughnessy et al. ...... 370/390 |
| 6,195,705 B1 | | 2/2001 | Leung |
| 6,240,089 B1 | * | 5/2001 | Okanoue et al. ............ 370/390 |
| 6,339,830 B1 | | 1/2002 | See et al. ................... 713/202 |
| 6,496,704 B2 | * | 12/2002 | Yuan ........................... 455/466 |
| 6,501,767 B1 | * | 12/2002 | Inoue et al. ................ 370/465 |
| 6,577,609 B2 | * | 6/2003 | Sharony ...................... 370/312 |
| 6,654,371 B1 | * | 11/2003 | Dunstan et al. ............. 370/390 |

OTHER PUBLICATIONS

T. Li, B. Cole, P. Morton, and D. Li, "Cisco Hot Standby Router Protocol (HSRP)," Mar., 1998, Network Working Group RFC 2281 (http://ftp.ietf.org/rfc/rfc2281.txt?number=2281).

(List continued on next page.)

*Primary Examiner*—Wellington Chin
*Assistant Examiner*—Brenda Pham
(74) *Attorney, Agent, or Firm*—Beyer Weaver & Thomas LLP (57) ABSTRACT

Methods and apparatus for optimizing IP multicast data transmission in a mobile IP environment include a Foreign Agent that is capable of receiving an information request associated with a host membership report sent from a mobile node and for providing information identifying a Home Agent associated with the mobile node to a multicast router process to enable the multicast router process to send a join host group message to the Home Agent. A Home Agent receives the join host group message and sends the join host group message toward a source of IP multicast data packets. Both the Foreign Agent and the Home Agent set up a data path between the Home Agent and the Foreign Agent, thereby enabling data packets addressed to the multicast group address to be forwarded by the Home Agent to the Foreign Agent. The Home Agent does not replicate multicast IP data packets addressed to the multicast group address prior to being forwarded by the Home Agent to the Foreign Agent. Rather, the multicast router process is responsible for replication and transmission of multicast IP data packets to one or more network segments associated with the Foreign Agent.

43 Claims, 8 Drawing Sheets

OTHER PUBLICATIONS

Release notes for 3Com Corporation, "Conducting a Redundant Route for Network Resiliency", Mar. 1994, *NET Builder Family Bridge/Router,* pp. 26–29.

J. Moy, RFC 1247 "OSPF Version 2", Jul. 19, 1991.

D. Oran, RFC 1142 *"OSI IS–IS Intra–Domain Routing Protocol",* Feb. 1990.

Uyless Black, *"TCP/IP and Related Protocols",* 1992, *McGraw–Hill, Inc.,* pp. 226–249.

S. Deering, "Host Extensions for IP Multicasting," Network working Group, RFC 1112, Aug. 1989, pp. 1–16.

Chambless, et al., "Home Agent Redundancy Protocol (HARP)", Oct. 27, 1997.

Networking Working Group, RFC 2002 "IP Mobility Support", Oct. 1996.

* cited by examiner

Multicast forwarding table

| Destination Multicast Address /⁻802 | Interface /⁻804 |
|---|---|
| Multicast address 1 | e0 |
| Multicast address 2 | e1 |
| • | |
| • | |
| • | |

OPTIMIZING IP MULTICAST DATA TRANSMISSION IN A MOBILE IP ENVIRONMENT

BACKGROUND OF THE INVENTION

1. Field of the Invention

The present invention relates to Mobile IP network technology. More particularly, the present invention relates to optimizing the transmission of IP multicast data in a Mobile IP environment.

2. Description of the Related Art

Mobile IP is a protocol which allows laptop computers or other mobile computer units (referred to as "Mobile Nodes" herein) to roam between various sub-networks at various locations—while maintaining internet and/or WAN connectivity. Without Mobile IP or related protocol, a Mobile Node would be unable to stay connected while roaming through various sub-networks. This is because the IP address required for any node to communicate over the internet is location specific. Each IP address has a field that specifies the particular sub-network on which the node resides. If a user desires to take a computer which is normally attached to one node and roam with it so that it passes through different sub-networks, it cannot use its home base IP address. As a result, a business person traveling across the country cannot merely roam with his or her computer across geographically disparate network segments or wireless nodes while remaining connected over the internet. This is not an acceptable state-of-affairs in the age of portable computational devices.

To address this problem, the Mobile IP protocol has been developed and implemented. An implementation of Mobile IP is described in RFC 2002 of the Network Working Group, C. Perkins, Ed., October 1996. Mobile IP is also described in the text "Mobile IP Unplugged" by J. Solomon, Prentice Hall. Both of these references are incorporated herein by reference in their entireties and for all purposes.

Figure 1:
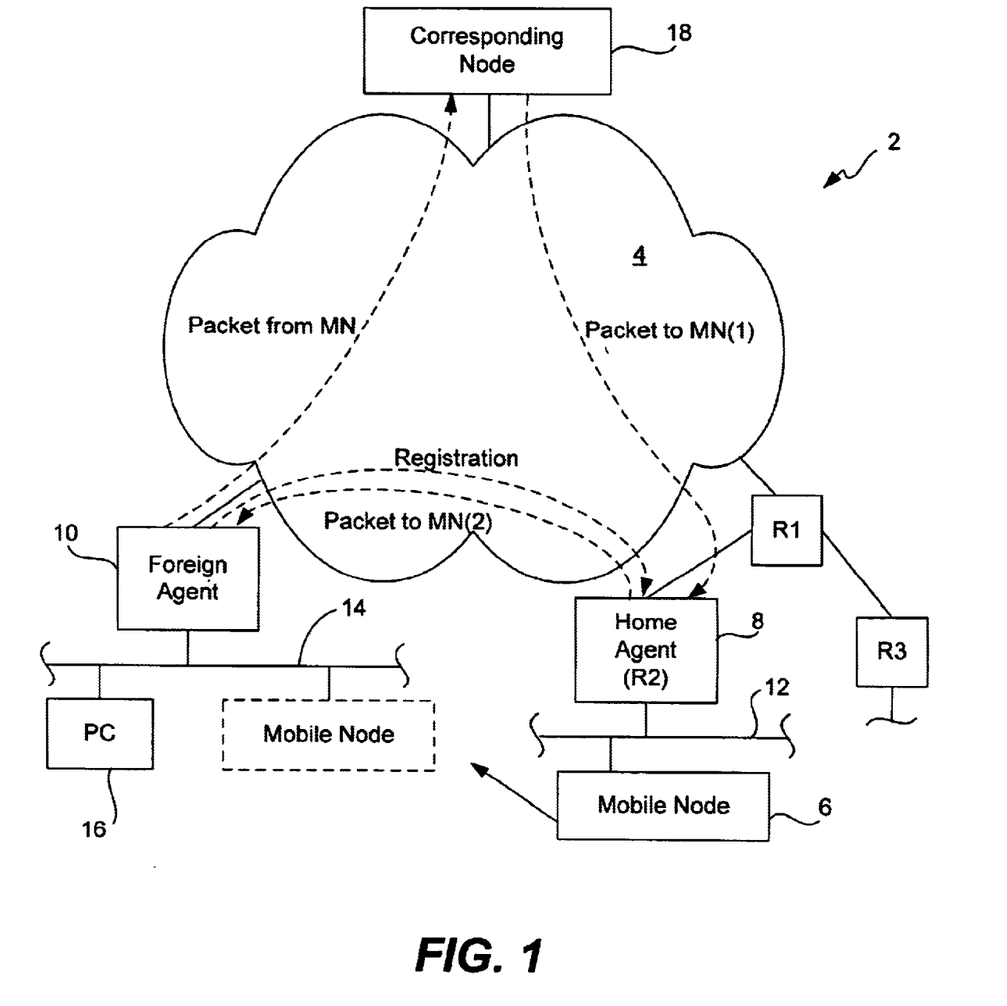
FIG. 1 is a diagram illustrating a Mobile IP network segment and associated environment.

The Mobile IP process and environment are illustrated in FIG. 1. As shown there, a Mobile IP environment 2 includes the internet (or a WAN) 4 over which a Mobile Node 6 can communicate remotely via mediation by a Home Agent 8 and a Foreign Agent 10. Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the internet through its designated Home Agent. When the Mobile Node roams, it communicates via the internet through an available Foreign Agent. Presumably, there are many Foreign Agents available at geographically disparate locations to allow wide spread internet connection via the Mobile IP protocol. Note that it is also possible for the Mobile Node to register directly with its Home Agent.

As shown in FIG. 1, Mobile Node 6 normally resides on (or is "based at") a network segment 12 which allows its network entities to communicate over the internet 4 through Home Agent 8 (an appropriately configured router denoted R2). Note that Home Agent 8 need not directly connect to the internet. For example, as shown in FIG. 1, it may be connected through another router (a router R1 in this case). Router R1 may, in turn, connect one or more other routers (e.g., a router R3) with the internet.

Now, suppose that Mobile Node 6 is removed from its home base network segment 12 and roams to a remote network segment 14. Network segment 14 may include various other nodes such as a PC 16. The nodes on network segment 14 communicate with the internet through a router which doubles as Foreign Agent 10. Mobile Node 6 may identify Foreign Agent 10 through various solicitations and advertisements which form part of the Mobile IP protocol. When Mobile Node 6 engages with network segment 14, Foreign Agent 10 relays a registration request to Home Agent 8 (as indicated by the dotted line "Registration"). The Home and Foreign Agents may then negotiate the conditions of the Mobile Node's attachment to Foreign Agent 10. For example, the attachment may be limited to a period of time, such as two hours. When the negotiation is successfully completed, Home Agent 8 updates an internal "mobility binding table" which specifies the care-of address (e.g., a collocated care-of address or the Foreign Agent's IP address) in association with the identity of Mobile Node 6. Further, the Foreign Agent 10 updates an internal "visitor table" which specifies the Mobile Node address, Home Agent address, etc. In effect, the Mobile Node's home base IP address (associated with segment 12) has been shifted to the Foreign Agent's IP address (associated with segment 14).

Now, suppose that Mobile Node 6 wishes to send a message to a corresponding node 18 from its new location. An output message from the Mobile Node is then packetized and forwarded through Foreign Agent 10 over the internet 4 and to corresponding node 18 (as indicated by the dotted line "packet from MN") according to a standard internet protocol. If corresponding node 18 wishes to send a message to Mobile Node—whether in reply to a message from the Mobile Node or for any other reason—it addresses that message to the IP address of Mobile Node 6 on sub-network 12. The packets of that message are then forwarded over the internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from corresponding node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on sub-network 14. The packet forwarding mechanism implemented by the Home and Foreign Agents is often referred to as "tunneling."

IP multicasting is the transmission of an IP packet to a "host group" (i.e., multicast group), a set of zero or more hosts identified by a single IP destination address. RFC 1112 sets forth the recommended standard for IP multicasting on the Internet. Internetwork forwarding of IP multicast packets is handled by "multicast routers" which may be co-resident with, or separate from, internet gateways. In addition, support for IP multicasting requires implementation of the Internet Group Management Protocol (IGMP). Thus, through IGMP, a node (e.g., receiver) may join a multicast group in order to receive packets addressed to that multicast group IP address.

Figure 2:
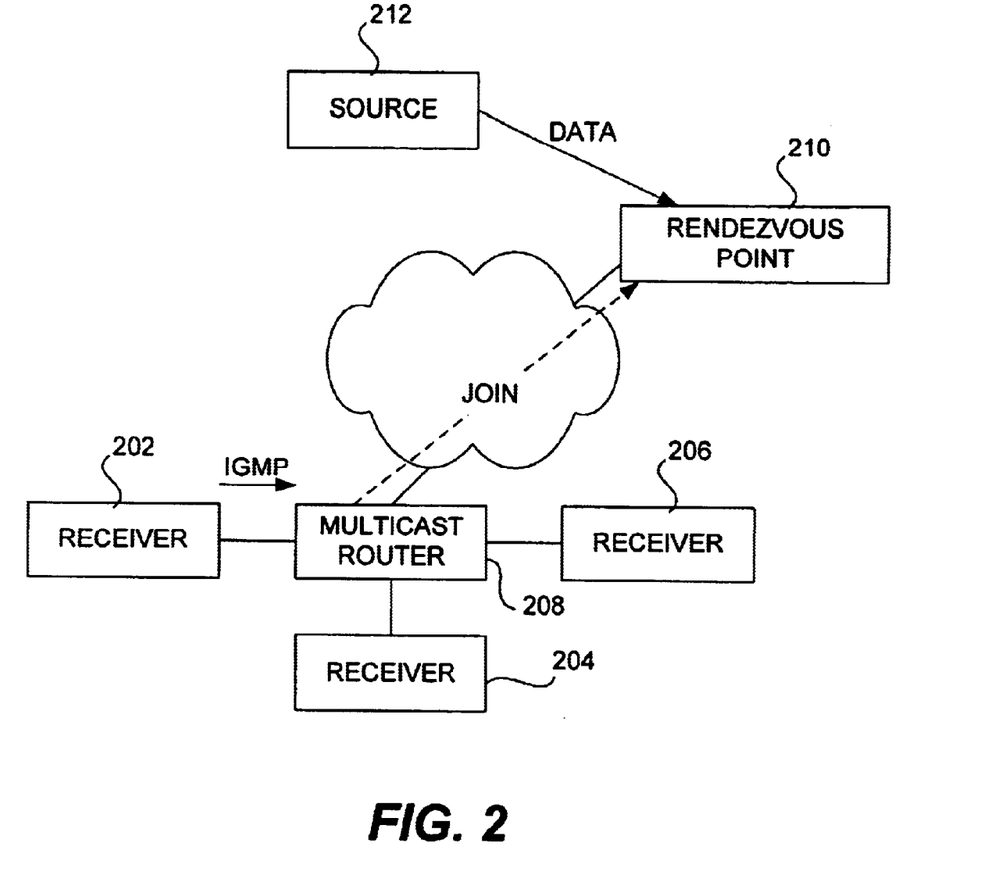
FIG. 2 is a block diagram illustrating IP multicast data flow in a fixed environment.

FIG. 2 is a block diagram illustrating IP multicast data flow in a fixed environment. As shown, multiple receivers 202, 204, and 206 may be coupled to a single multicast router 208. For instance, each receiver may be associated with a television capable of receiving multicast data. When the receiver 202 wants to listen to a particular multicast group IP address, the receiver 202 sends an IGMP report.

This may occur, for example, when a television viewer changes the channel on the television. An IGMP report, or "host membership report," reports each host group to which the receiver belongs. In the normal case, only one report will be generated for each group present on the network by the first receiver to send such a report. This is sufficient since a multicast router need not know which hosts belong to a multicast group; only that at least one host belongs to a multicast group on a particular network. The host membership report indicates to the router 208 that multicast packets for that multicast group need to be replicated and forwarded. When the router 208 receives the IGMP report, the router 208 sends a join host group message toward a rendezvous point 210 which is recognized by both the receiver 202 and source 212. In other words, the rendezvous point 210 is established for communicating messages between the receiver 202 and the source 212. A join host group message specifies the multicast group address of the host group the receiver 202 wishes to join. In addition, the join host group message serves to request that the receiving network module accept and deliver subsequently arriving packets destined to the specified IP host group address. Moreover, the router 208 is aware of the location of the rendezvous point 210. The router 208 then sets up a data path between the router 208 and the rendezvous point 210 for the transmission and forwarding of multicast data from the rendezvous point 210 to the router 208. Thus, when the source 212 sends streaming data (e.g., television channel or stock information) to the rendezvous point 210, the rendezvous point 210 forwards the data to the router 208. The router 208 then makes copies of the packet and sends the packet to each subnet with receiver that has joined that particular multicast group. In this example, the router 208 sends the packet to the receiver 202. If any other receivers (e.g., 204, 206) have joined the multicast group, copies of the packet are sent to these receivers as well, if they are on different subnets.

It is important to note that for multicast data transmission, packets must be replicated for transmission to the appropriate receivers. However, in a Mobile IP environment, the designated method of replication of packets is specifically addressed by RFC 2002. RFC 2002 defines a method to support IP multicast data transmission in a Mobile IP environment. More particularly, RFC 2002 specifically requires that the Home Agent replicate broadcast and multicast data packets for transmission to multiple devices (e.g., mobile nodes) destined to receive the packets.

Although RFC 2002 enables IP multicast data to be transmitted in a Mobile IP environment, this method is sub-optimal, since it requires the Home Agent to duplicate multicast packets for transmission to each mobile node via a tunnel to the Foreign Agent. This replication by the Home Agent is required, even if all mobile nodes are visiting the same Foreign Agent. It is important to note that the distance between the Home Agent and the Foreign Agent may be substantial, consuming network bandwidth and switch processing during the replication process. In view of the above, it would be desirable to optimize IP multicast data transmission in a Mobile IP environment.

SUMMARY OF THE INVENTION

The present invention optimizes the transmission of IP multicast data in a mobile IP environment. This is accomplished by performing packet replication and transmission at the Foreign Agent or associated multicast router rather than at the Home Agent. In order to modify the packet replication process, the present invention provides a mechanism for establishing a data path between the Foreign Agent and the Home Agent that enables this method of packet replication and transmission.

In accordance with one aspect of the invention, a Foreign Agent is configured to establish a data path between the Foreign Agent and a Home Agent, where the data path is adapted for transmission of multicast IP data packets from the Home Agent to the Foreign Agent so that the multicast data packets may be transmitted to one or more mobile nodes visiting the Foreign Agent. The Foreign Agent receives an information request associated with a host membership report sent from a mobile node, where the host membership report specifies a multicast group address identifying a host group to which the mobile node belongs. For example, the information request may ask whether the mobile node is allowed to join the host group, it may indicate that information identifying the Home Agent is requested from the Foreign Agent, and/or it may ask whether the mobile node is visiting the Foreign Agent. In response to this information request, the Foreign Agent provides information identifying the Home Agent associated with the mobile node to a multicast router process, thereby enabling the multicast router process to send a join host group message to the Home Agent. The join host group message specifies the multicast group address and operates to request that the Home Agent accept and deliver subsequently arriving multicast data packets destined to the multicast group address to the Foreign Agent.

In accordance with another aspect of the invention, a multicast router implements a multicast router process. The multicast router is adapted for receiving a host membership report sent from a mobile node. The multicast router then sends an information request associated with the host membership report to a Foreign Agent that the mobile node is visiting. For instance, the information request may request information identifying a Home Agent of the mobile node or it may ask the Foreign Agent whether the mobile node is visiting the Foreign Agent. The multicast router is further configured to receive any information identifying the Home Agent from the Foreign Agent. In addition, the multicast router may send a join host group message to the Home Agent, where the join host group message specifies the multicast group address and requests that the Home Agent accept and deliver subsequently arriving packets destined to the multicast group address to the Foreign Agent. For instance, the join host group message may be sent to the Home Agent when the mobile node is visiting the Foreign Agent.

In accordance with yet another aspect of the invention, a Home Agent is configured to establish a data path between a Foreign Agent and the Home Agent, where the data path is adapted for transmission of multicast IP data packets from the Home Agent to the Foreign Agent so that the multicast data packets may be transmitted to one or more mobile nodes visiting the Foreign Agent. The Home Agent is configured to receive a join host group message and send the join host group message toward a source of multicast IP data packets. The Home Agent then sets up a data path between the Home Agent and the Foreign Agent, thereby enabling packets addressed to the multicast group address to be forwarded by the Home Agent to the Foreign Agent. Thus, the Home Agent may forward multicast data packets using a single encapsulation step since the Home Agent is not responsible for replication of the multicast data packets.

DETAILED DESCRIPTION OF THE INVENTION

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

As mentioned previously, a mobile node that is connected to its home network functions in the same way as any other fixed host or router. Thus, when it is at home, a mobile node functions identically to other multicast senders and receivers. The present invention provides methods and apparatus for supporting IP multicast data transmission in a Mobile IP environment when a mobile node is visiting a foreign network.

Figure 3:
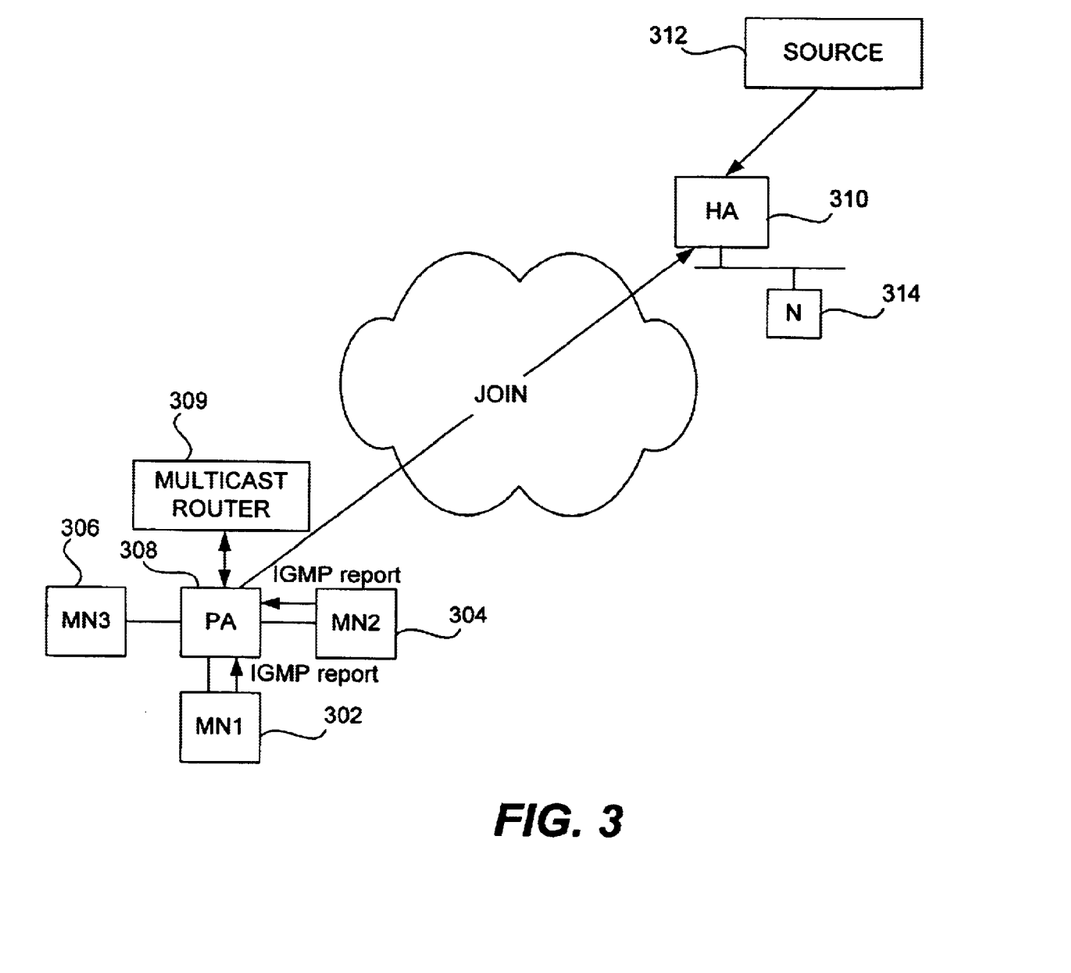
FIG. 3 is a block diagram illustrating a system in which multicast may be implemented in a Mobile IP environment in accordance with an embodiment of the invention.

FIG. 3 is a block diagram illustrating a system in which multicast data transmission may be implemented in a Mobile IP environment in accordance with an embodiment of the invention. As shown, multiple mobile nodes 302, 304, and 306 may be visiting a Foreign Agent 308. The present invention establishes a data path for multicast data transmission, enabling data packets to be replicated by a multicast router 309 coupled to the Foreign Agent, rather than by the Home Agent. When the mobile nodes 302 and 304 join a multicast group, they each separately send a join IGMP report to the Foreign Agent 308. In response to receiving the join IGMP report, the Foreign Agent 308 (or the associated multicast router 309) sends a join host group message to a Home Agent 310 supporting the mobile nodes 302, 304. The Home Agent typically forwards data addressed to a mobile node supported by it to the mobile node's current care-of address. However, as described above, multicast data packets must be replicated for transmission to multiple receivers. As mandated by RFC 2002, when a source 312 sends IP multicast data to the Home Agent 310 for transmission to multiple mobile nodes, the Home Agent 310 is responsible for replicating the data packet which is then sent separately to the mobile nodes 302 and 304. However, in accordance with the present invention, such replication is performed at the Foreign Agent 308 or by the associated multicast router 309, which may be implemented separately from the Foreign Agent 308 or combined with the Foreign Agent 308 as a single entity.

Figure 4:
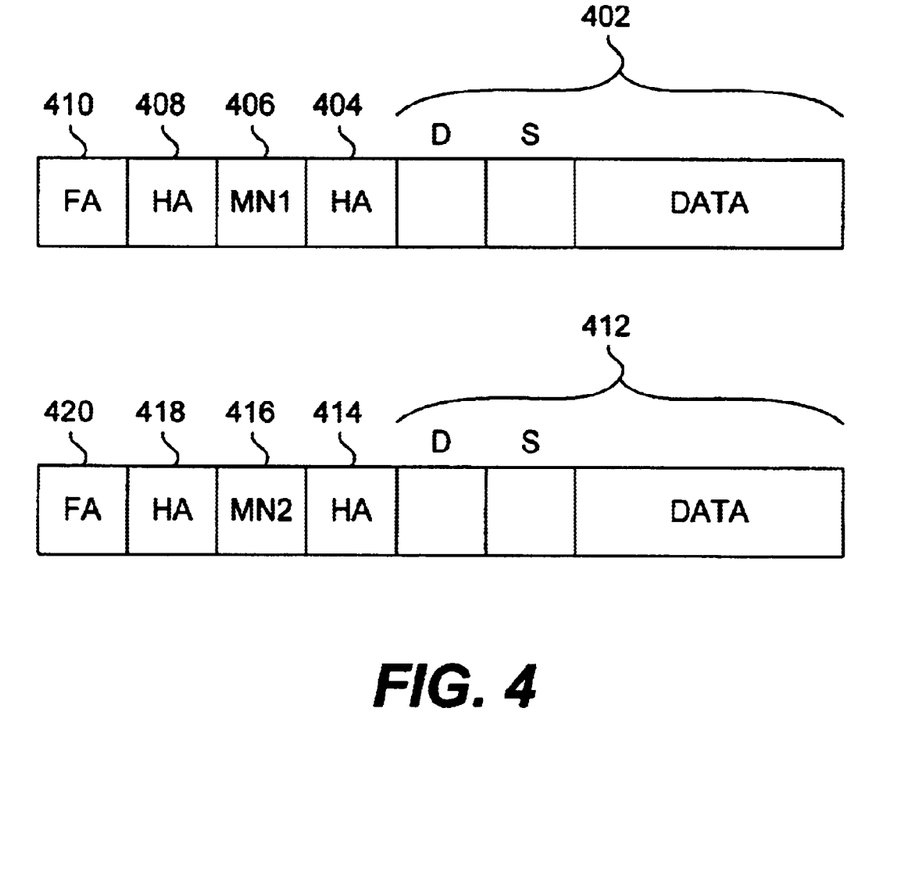
FIG. 4 is diagram illustrating exemplary encapsulated packets sent by the to Home Agent to each recipient in accordance with RFC 2002.

In accordance with RFC 2002, the Home Agent is responsible for replicating and forwarding multicast and broadcast data packets to each mobile node. FIG. 4 is diagram illustrating exemplary encapsulated packets sent by the Home Agent to each recipient in accordance with RFC 2002. For instance, as shown and described above with reference to FIG. 3, two mobile nodes, MN1 and MN2, may each separately send a host membership report or "join IGMP report" to join a particular multicast group. Thus, the Home Agent must encapsulate the packet for both mobile nodes, MN1 and MN2, in accordance with RFC 2002. As shown, the data packet 402 is encapsulated by the Home Agent, which provides the Home Agent address as the source address 404 and the destination address as the address of MN 406. In addition, the outer encapsulation specifies that the Home Agent is the source 408 while the Foreign Agent is the destination 410. Thus, the Foreign Agent receiving an encapsulated packet may strip the outer encapsulation and forward the remaining information to MN1. Similarly, the data packet 412 is encapsulated with an inner encapsulation specifying a Home Agent source address 414 and a destination MN2 address 416. An outer encapsulation specifies a Home Agent source address 418 and Foreign Agent destination address 420. Thus, this replicated packet may similarly be forwarded to the Foreign Agent which strips the outer encapsulation and forwards the remaining packet to MN2.

Figure 5:
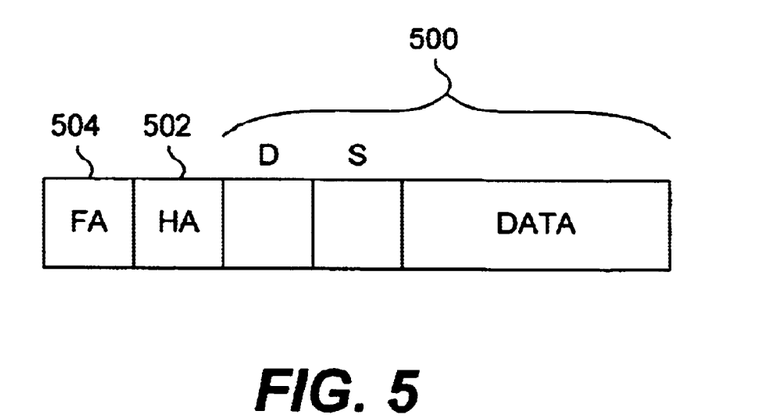
FIG. 5 is a diagram illustrating an exemplary encapsulated packet sent by the Home Agent to the Foreign Agent in accordance with one embodiment of the present invention.

As described above with reference to FIG. 4, replication of packets by the Home Agent requires two distinct encapsulation steps for each packet. It is therefore desirable to optimize the encapsulation process. FIG. 5 is a diagram illustrating an exemplary encapsulated packet sent by the Home Agent to the Foreign Agent in accordance with one embodiment of the present invention. As shown, when the Home Agent encapsulates the packet 500, it specifies the source address as the Home Agent address 502 and the destination address as the Foreign Agent address 504. In other words, the Home Agent need not encapsulate the packet for each mobile node, which would require the additional inner encapsulation shown in FIG. 4. Rather, in accordance with the present invention, replication and forwarding of the data packet to mobile nodes visiting various network segments on the foreign network is performed by the Foreign Agent or associated multicast router process.

Figure 6:
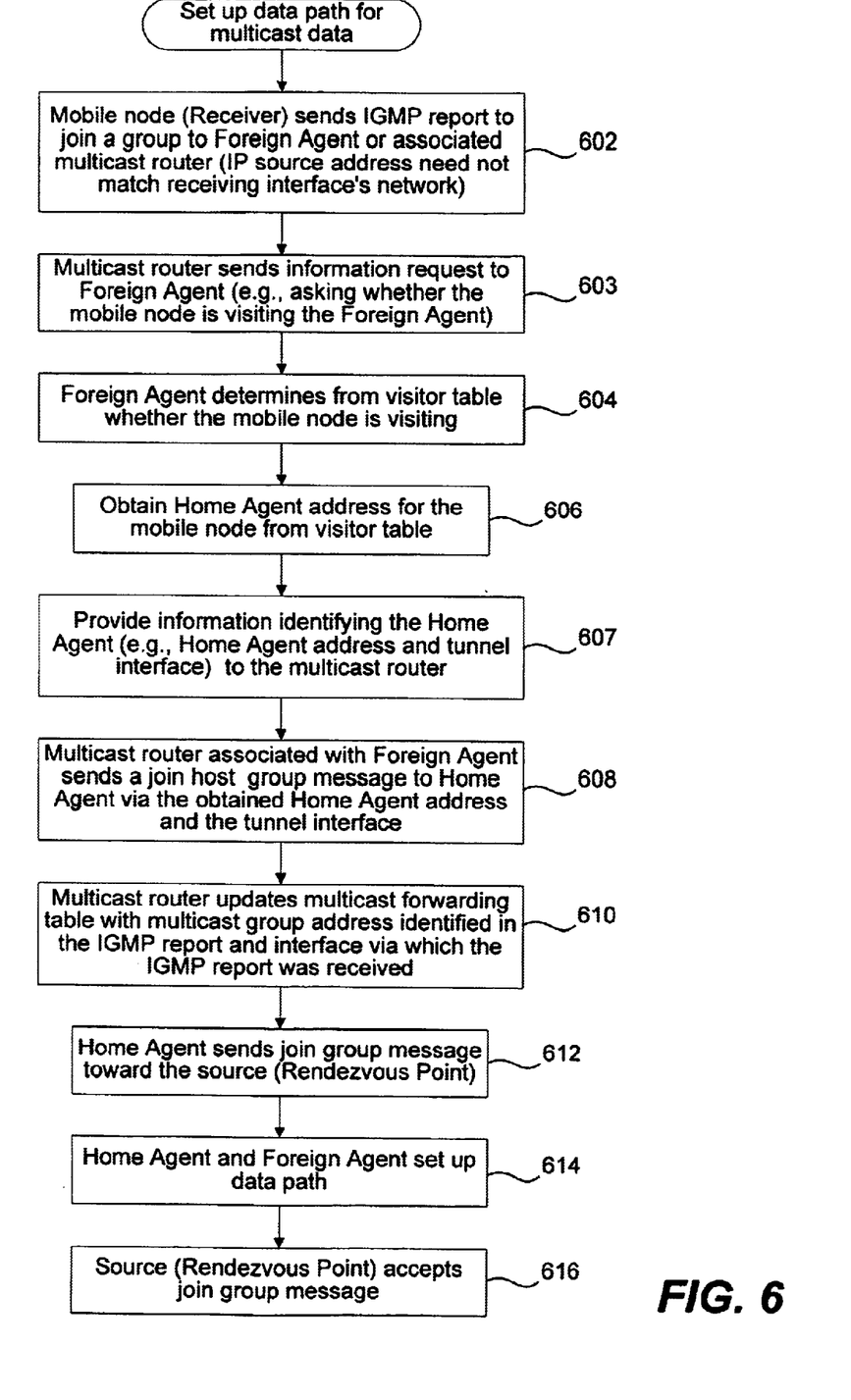
FIG. 6 is a process flow diagram illustrating one method of setting up a data path for multicast data in accordance with one embodiment of the invention.

FIG. 6 is a process flow diagram illustrating one method of setting up a data path for multicast data in accordance with one embodiment of the invention. When a mobile node wishes to join a multicast group, the mobile node as the receiver sends a host membership report (i.e., IGMP report) to the Foreign Agent (or associated multicast router) at block 602. The host membership report specifies a multicast group address identifying a host group to which the mobile node belongs. Although a multicast router typically verifies that the IP source address specified in the host membership report match the receiving interface's network, the IP source address need not match the receiving interface's network in a Mobile IP environment. Thus, the Foreign Agent (and associated multicast router) do not check that these networks match. In addition, in order for a multicast router process to communicate with the standard processes performed by the Foreign Agent, the multicast router determines whether the mobile node is allowed to join the host group. This may be accomplished by sending a message (i.e., information request) to the Foreign Agent at block 603 asking the Foreign Agent whether the mobile node is allowed to join the host group. For example, the message may ask the Foreign Agent whether the mobile node is visiting the Foreign Agent. As another example, the message may indicates that information identifying a Home Agent associated with the mobile node is requested from the Foreign Agent. The Foreign Agent then determines from a visitor table whether the mobile node is visiting the Foreign Agent at block 604. Assuming that the mobile node is visiting the Foreign Agent, information identifying a Home Agent associated with the mobile node may be obtained from a visitor table at block 606. Information identifying the Home Agent may include the Home Agent address for the mobile node (e.g., the Home Agent address) and tunnel interface. The information identifying the Home Agent is then sent to a multicast router process at block 607. The multicast router process may be implemented in a multicast router that is separate from the Foreign Agent or integral with the Foreign Agent. The multicast router process associated with the Foreign Agent sends a join host group message to the Home Agent via the obtained Home Agent address and the tunnel interface at block 608. The join host group message specifies the multicast group address and operates to request that the Home Agent accept and deliver subsequently arriving packets destined to the multicast group address to the Foreign Agent. The Foreign Agent (or associated multicast router) updates a multicast forwarding table with the multicast group address identified in the IGMP report as well as the interface via which the IGMP report was received at block 610. An exemplary multicast forwarding table will be described in further detail below with reference to FIG. 8. The Home Agent sends a join group message toward the source (i.e., rendezvous point) at block 612. The Home Agent and Foreign Agent then set up the data path at block 614, thereby enabling packets addressed to the multicast group address to be forwarded by the Home Agent to the Foreign Agent. The source (i.e., rendezvous point) also accepts the join group message at block 616. If the source does not accept the join group message, pruning may subsequently be performed to update the data path previously created.

Figure 7:
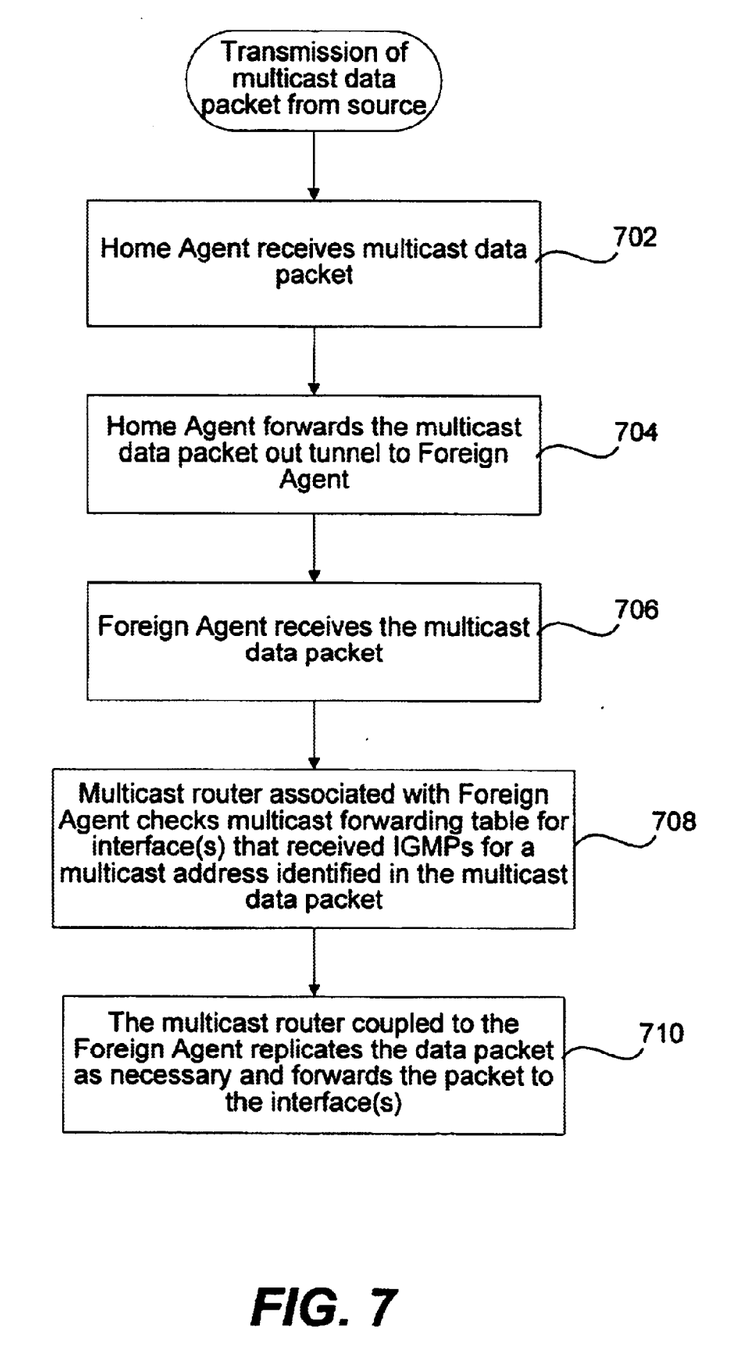
FIG. 7 is a process flow diagram illustrating one method of sending multicast packets from a source in accordance with one embodiment of the invention.

Once the data path is established for transmission of multicast data packets, the source may transmit multicast data packets to a rendezvous point (e.g., Home Agent). FIG. 7 is a process flow diagram illustrating one method of sending multicast packets from a source in accordance with one embodiment of the invention. The Home Agent receives a multicast data packet from the source at block 702. The Home Agent then forwards the multicast data packet out the tunnel previously created to the Foreign Agent at block 704. The Foreign Agent receives the multicast data packet at block 706. The Foreign Agent or associated multicast router then replicates the data packet as appropriate and forwards the data packet to each network associated with one or more mobile nodes. In other words, the Foreign Agent need not replicate the data packet for mobile nodes on the same network segment. Thus, the Foreign Agent need only determine the network(s) that should receive the multicast data packet. One method for determining the network(s) to receive the packet is to identify the associated interfaces on the Foreign Agent. More particularly, the Foreign Agent (or associated multicast router) checks a multicast forwarding table for interface(s) that received IGMP reports for a multicast address identified in the associated multicast data packet 708. An exemplary multicast forwarding table will be described in further detail below with reference to FIG. 8. The Foreign Agent (or associated multicast router) then replicates the data packet as necessary and forwards the packet to the interface(s) at block 710.

Figure 8:
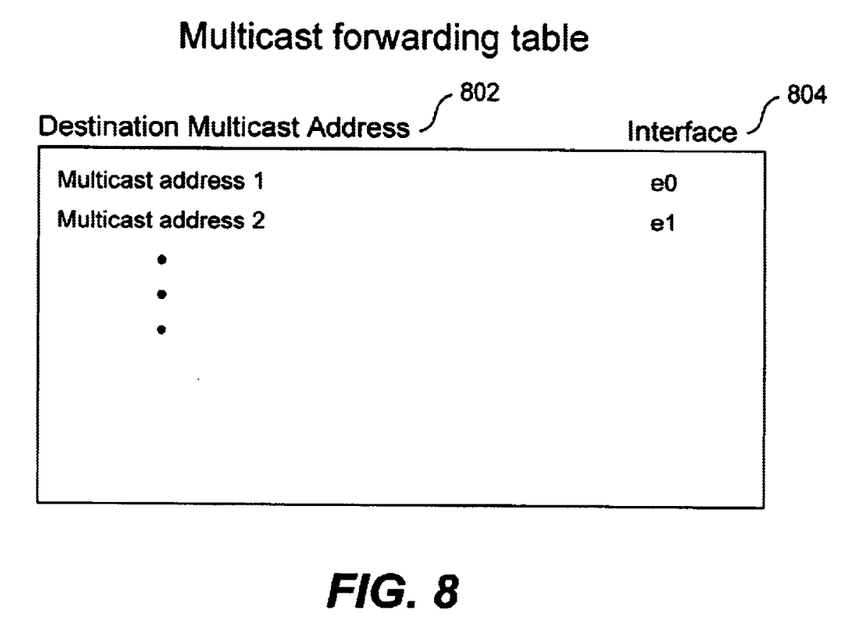
FIG. 8 is a diagram illustrating an exemplary multicast forwarding table that may be accessed by the Foreign Agent at block 708 of FIG. 7.

As described above with reference to FIG. 7, in accordance with one embodiment, the Foreign Agent (or associated multicast router) checks a multicast forwarding table in order to determine the interfaces that are to receive the multicast data packet. FIG. 8 is a diagram illustrating an exemplary multicast forwarding table that may be accessed by the Foreign Agent or associated multicast router at block 708 of FIG. 7. As shown, a multicast forwarding table associates each multicast address 802 with one or more interfaces 804 that have indicated that they want to listen to the multicast group address 802 identified. In this manner, a list of host group memberships associated with each network interface is maintained. The list is typically updated in response to a join or leave host group message. Thus, when a multicast data packet is received by the Foreign Agent, the Foreign Agent simply performs a table look up for the associated multicast address.

The invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, and optical data storage devices.

The apparatus (Home Agent, Foreign Agent, multicast router and/or node) of this invention may be specially constructed for the required purposes, or may be a general purpose programmable machine selectively activated or reconfigured by a computer program stored in memory. The processes presented herein are not inherently related to any particular router or other apparatus. In a preferred embodiment, any of the Home and Foreign Agents of this invention may be specially configured routers such as specially configured router models 2500, 2600, 3600, 4000, 4500, 4700, 7200, and 7500 available from Cisco Systems, Inc. of San Jose, Calif. A general structure for some of these machines will appear from the description given below.

Generally, the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid registration system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the routers of the present invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the present invention may be implemented on a general-purpose network host machine such as a personal computer or workstation. Further, the invention may be at least partially implemented on a card (e.g., an interface card) for a network device or a general-purpose computing device.

Figure 9:
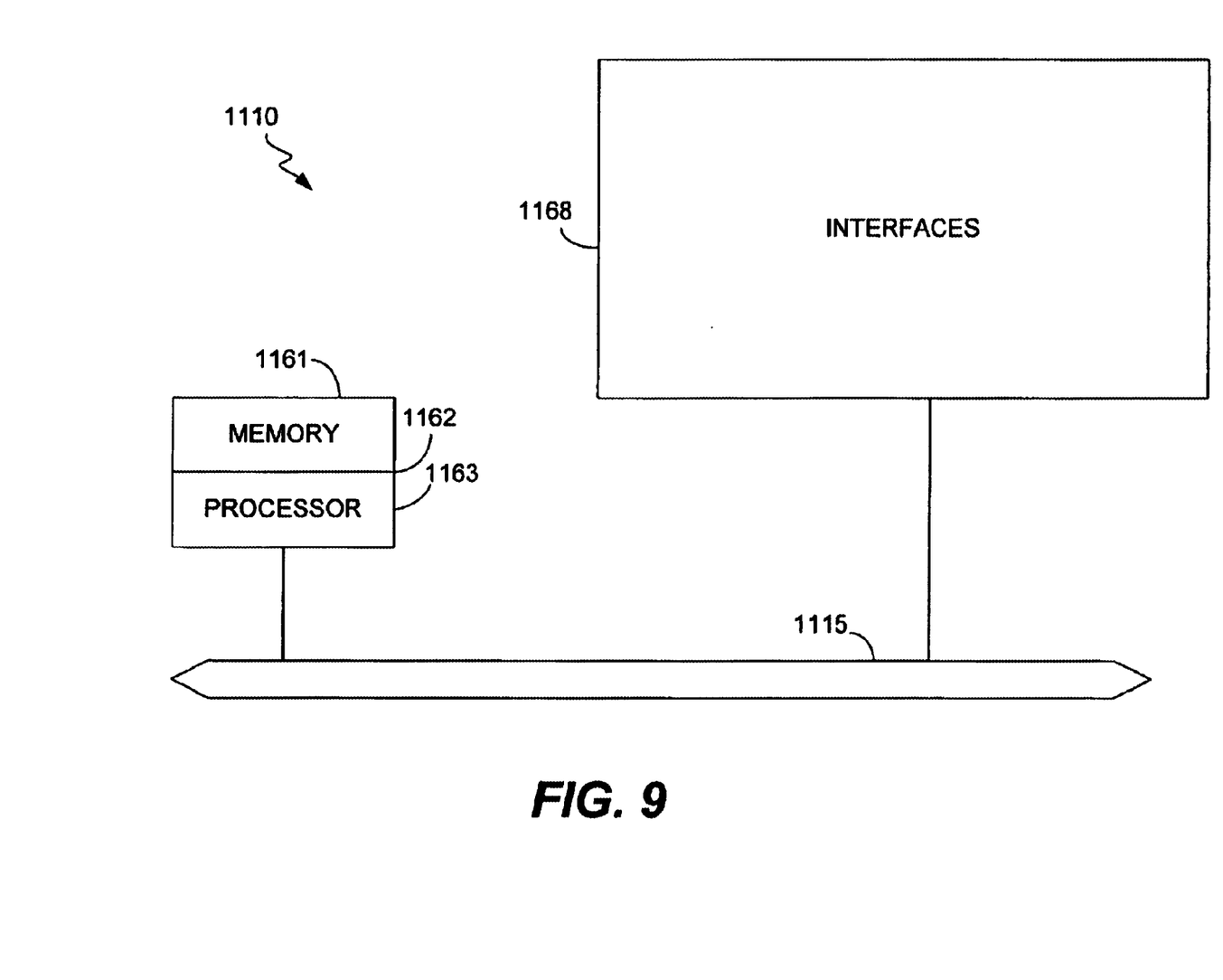
FIG. 9 is a block diagram of a network device that may be configured to implement aspects of the present invention.

Referring now to FIG. 9, a router 1110 suitable for implementing the present invention includes a master central processing unit (CPU) 1162, interfaces 1168, and a bus 1115 (e.g., a PCI bus). When acting under the control of appropriate software or firmware, the CPU 1162 is responsible for such router tasks as routing table computations and network management. It may also be responsible for updating mobility binding and visitor tables, etc. It preferably accomplishes all these functions under the control of software including an operating system (e.g., the Internetwork Operating System (IOS®) of Cisco Systems, Inc.) and any appropriate applications software. CPU 1162 may include one or more processors 1163 such as a processor from the Motorola family of microprocessors or the MIPS family of microprocessors. In an alternative embodiment, processor 1163 is specially designed hardware for controlling the operations of router 1110. In a specific embodiment, a memory 1161 (such as non-volatile RAM and/or ROM) also forms part of CPU 1162. However, there are many different ways in which memory could be coupled to the system.

The interfaces 1168 are typically provided as interface cards (sometimes referred to as "line cards"). Generally, they control the sending and receiving of data packets over the network and sometimes support other peripherals used with the router 1110. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1162 to efficiently perform routing computations, network diagnostics, security functions, etc.

Although the system shown in FIG. 9 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (including memory 1161) configured to store program instructions for the general-purpose network operations and mechanisms for registration and routing functions described herein. The program instructions may control the operation of an operating system and/or one or more applications, for example. The memory or memories may also be configured to store tables such as mobility binding and visitor tables, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. For instance, although the specification has described routers, other entities used to tunnel packets to mobile nodes on remote network segments can be used as well. For example, bridges or other less intelligent packet switches may also employ the standby protocol of this invention. Accordingly, the present embodiments are to be considered as illustrative and not restrictive, and the invention is not to be limited to the details given herein, but may be modified within the scope and equivalents of the appended claims.

What is claimed is:

1. A Foreign Agent that supports Mobile IP, the Foreign Agent being configured to establish a data path between the Foreign Agent and a Home Agent, the data path being adapted for transmission of multicast IP data packets from the Home Agent to the Foreign Agent to enable the multicast IP data packets to be transmitted to one or more mobile nodes visiting the Foreign Agent, the Foreign Agent comprising:
   a processor; and
   a memory, the memory storing therein the following instructions:
      instructions for receiving an information request associated with a host membership report sent from a mobile node, the host membership report specifying a multicast group address identifying a host group to which the mobile node belongs; and
      instructions for providing information identifying a Home Agent associated with the mobile node to a multicast router process in response to the information request, the information identifying the Home Agent thereby enabling the multicast router process to send a join host group message to the Home Agent, the join host group message specifying the multicast group address and requesting that the Home Agent accept and deliver subsequently arriving multicast data packets destined to the multicast group address to the Foreign Agent.

2. The Foreign Agent as recited in claim 1, wherein the multicast router process is adapted for replicating a multicast data packet that is addressed to the multicast group address and transmitting the replicated multicast data packet to a network segment associated with the Foreign Agent.

3. The Foreign Agent as recited in claim 1, wherein the host membership report further identifies an IP source address, the host membership report being received from an interface, wherein the Foreign Agent does not verify that a network portion of the IP source address matches a network associated with the interface.

4. The Foreign Agent as recited in claim 3, wherein the interface is an interface of the Foreign Agent.

5. The Foreign Agent as recited in claim 3, wherein the interface is an interface of a multicast router implementing the multicast router process.

6. The Foreign Agent as recited in claim 1, wherein the multicast router process is implemented in a multicast router that is separate from the Foreign Agent.

7. The Foreign Agent as recited in claim 1, wherein the information request indicates that the information identifying the Home Agent is requested from the Foreign Agent.

8. The Foreign Agent as recited in claim 1, wherein the information request asks whether the mobile node is allowed to join the host group.

9. The Foreign Agent as recited in claim 1, wherein the information request asks whether the mobile node is visiting the Foreign Agent.

10. The Foreign Agent as recited in claim 8, wherein the instructions for providing information identifying the Home Agent to the multicast router process are performed when the mobile node is allowed to join the host group.

11. The Foreign Agent as recited in claim 8, further comprising:
    instructions for determining from a visitor table whether the mobile node is visiting the Foreign Agent, the mobile node being allowed to join the host group when the mobile node is visiting the Foreign Agent and otherwise not allowed to join the host group.

12. The Foreign Agent as recited in claim 1, wherein the instructions for providing information identifying the Home Agent to a multicast router process comprise:
    instructions for obtaining a Home Agent address for the mobile node from a visitor table; and
    instructions for providing the Home Agent address to the multicast router process.

13. The Foreign Agent as recited in claim 12, wherein the instructions for providing information identifying the Home Agent to a multicast router process comprise:
    instructions for obtaining a tunnel interface for the mobile node from a visitor table; and
    instructions for providing the tunnel interface to the multicast router process.

14. The Foreign Agent as recited in claim 1, further comprising:
    instructions for setting up a data path between the Foreign Agent and the Home Agent.

15. A Home Agent that supports Mobile IP, the Home Agent being configured to establish a data path between a Foreign Agent and the Home Agent, the data path being adapted for transmission of multicast IP data packets from the Home Agent to the Foreign Agent to enable the multicast IP data packets to be transmitted to one or more mobile nodes visiting the Foreign Agent, the Home Agent comprising:
    a processor; and
    a memory, the memory storing therein the following instructions:
        instructions for receiving a join host group message, the join host group message specifying a multicast group address and requesting that the Home Agent accept and deliver subsequently arriving packets destined to the multicast group address to the Foreign Agent;
        instructions for sending the join host group message toward a source of multicast IP data packets; and
        instructions for setting up a data path between the Home Agent and the Foreign Agent, thereby enabling packets addressed to the multicast group address to be forwarded by the Home Agent to the Foreign Agent.

16. The Home Agent as recited in claim 15, wherein the Home Agent is adapted for encapsulating a multicast IP data packet addressed to the multicast group address in a single encapsulation step specifying the Home Agent as a source of the multicast IP data packet and the Foreign Agent as a destination of the multicast IP data packet.

17. The Home Agent as recited in claim 15, wherein the Home Agent is not capable of replicating multicast IP data packets addressed to the multicast group address prior to being forwarded by the Home Agent to the Foreign Agent.

18. The Home Agent as recited in claim 15, wherein the instructions for receiving a join host group message comprise:
    instructions for receiving a join host group message from a multicast router process coupled to the Foreign Agent.

19. A multicast router for establishing a data path between a Foreign Agent and a Home Agent, the data path being adapted for transmission of multicast IP data packets from the Home Agent to the Foreign Agent to enable the multicast IP data packets to be transmitted to one or more mobile nodes visiting the Foreign Agent, comprising:
    a processor; and
    a memory, the memory storing therein the following instructions:
        instructions for receiving a host membership report sent from a mobile node, the host membership report specifying a multicast group address identifying a host group to which the mobile node belongs;
        instructions for sending an information request associated with the host membership report to a Foreign Agent that the mobile node is visiting, the information request requesting information identifying a Home Agent of the mobile node;
        instructions for receiving information identifying the Home Agent from the Foreign Agent; and
        instructions for sending a join host group message to the Home Agent, the join host group message specifying the multicast group address and requesting that the Home Agent accept and deliver subsequently arriving packets destined to the multicast group address to the Foreign Agent.

20. The multicast router as recited in claim 19, wherein the information identifying the Home Agent comprises a Home Agent address.

21. The multicast router as recited in claim 20, wherein the information further comprises a tunnel interface.

22. The multicast router as recited in claim 19, further comprising:
    instructions for replicating and transmission of a multicast data packet to one or more network segments associated with the Foreign Agent.

23. A multicast router for establishing a data path between a Foreign Agent and a Home Agent, the data path being adapted for transmission of multicast IP data packets from the Home Agent to the Foreign Agent to enable the multicast IP data packets to be transmitted to one or more mobile nodes visiting the Foreign Agent, comprising:

a processor; and a memory, the memory storing therein the following instructions:

instructions for receiving a host membership report from a mobile node, the host membership report specifying a multicast group address identifying a host group to which the mobile node belongs;

instructions for sending an information request associated with the host membership report to a Foreign Agent that the mobile node is visiting, the information request asking the Foreign Agent whether the mobile node is visiting the Foreign Agent; and instructions for receiving information identifying a Home Agent from the Foreign Agent and sending a join host group message to the Home Agent when the mobile node is visiting the Foreign Agent, the join host group message specifying the multicast group address and requesting that the Home Agent accept and deliver subsequently arriving packets destined to the multicast group address to the Foreign Agent.

24. The multicast router as recited in claim 23, wherein the host membership report further identifies an IP source address, the host membership report being received from an interface, wherein the multicast router does not verify that a network portion of the IP source address matches a network associated with the interface.

25. The multicast router as recited in claim 24, wherein the interface is an interface of the Foreign Agent.

26. The multicast router as recited in claim 24, wherein the interface is an interface of the multicast router.

27. The multicast router as recited in claim 23, wherein the information identifying the Home Agent comprises a Home Agent address.

28. The multicast router as recited in claim 27, wherein the information further comprises a tunnel interface.

29. The multicast router as recited in claim 23, further comprising:

instructions for updating a multicast forwarding table with the multicast group address identified in the host membership report and interface of the Foreign Agent via which the host membership report was received.

30. The multicast router as recited in claim 29, further comprising:

instructions for replicating and transmitting a multicast data packet addressed to the multicast group address via the interface of the Foreign Agent via which the host membership report was received.

31. The multicast router as recited in claim 23, further comprising:

instructions for replicating and transmitting a multicast data packet to one or more network segments associated with the Foreign Agent.

32. A computer-readable medium for establishing at a Foreign Agent a data path between the Foreign Agent and a Home Agent, the data path being adapted for transmission of multicast IP data packets from the Home Agent to the Foreign Agent to enable the multicast IP data packets to be transmitted to one or more mobile nodes visiting the Foreign Agent, the computer-readable medium comprising:

instructions for receiving an information request associated with a host membership report sent from a mobile node, the host membership report specifying a multicast group address identifying a host group to which the mobile node belongs; and instructions for providing information identifying a Home Agent associated with the mobile node to a multicast router process in response to the information request, the information identifying the Home Agent thereby enabling the multicast router process to send a join host group message to the Home Agent, the join host group message specifying the multicast group address and requesting that the Home Agent accept and deliver subsequently arriving multicast data packets destined to the multicast group address to the Foreign Agent.

33. A computer-readable medium for establishing at a Home Agent a data path between a Foreign Agent and the Home Agent, the data path being adapted for transmission of multicast IP data packets from the Home Agent to the Foreign Agent to enable the multicast IP data packets to be transmitted to one or more mobile nodes visiting the Foreign Agent, the computer-readable medium comprising:

instructions for receiving a join host group message, the join host group message specifying a multicast group address and requesting that the Home Agent accept and deliver subsequently arriving packets destined to the multicast group address to the Foreign Agent;

instructions for sending the join host group message toward a source of multicast IP data packets; and instructions for setting up a data path between the Home Agent and the Foreign Agent, thereby enabling packets addressed to the multicast group address to be forwarded by the Home Agent to the Foreign Agent.

34. A computer-readable medium for establishing a data path between a Foreign Agent and a Home Agent, the data path being adapted for transmission of multicast IP data packets from the Home Agent to the Foreign Agent to enable the multicast IP data packets to be transmitted to one or more mobile nodes visiting the Foreign Agent, comprising:

instructions for receiving a host membership report sent from a mobile node, the host membership report specifying a multicast group address identifying a host group to which the mobile node belongs;

instructions for sending an information request associated with the host membership report to a Foreign Agent that the mobile node is visiting, the information request requesting information identifying a Home Agent of the mobile node;

instructions for receiving information identifying the Home Agent from the Foreign Agent; and instructions for sending a join host group message to the Home Agent, the join host group message specifying the multicast group address and requesting that the Home Agent accept and deliver subsequently arriving packets destined to the multicast group address to the Foreign Agent.

35. A computer-readable medium for establishing a data path between a Foreign Agent and a Home Agent, the data path being adapted for transmission of multicast IP data packets from the Home Agent to the Foreign Agent to enable the multicast IP data packets to be transmitted to one or more mobile nodes visiting the Foreign Agent, comprising:

instructions for receiving a host membership report from a mobile node, the host membership report specifying a multicast group address identifying a host group to which the mobile node belongs;

instructions for sending an information request associated with the host membership report to a Foreign Agent that the mobile node is visiting, the information request asking the Foreign Agent whether the mobile node is visiting the Foreign Agent; and instructions for receiving information identifying a Home Agent from the Foreign Agent and sending a join host group message to the Home Agent when the mobile node is visiting the Foreign Agent, the join host group message specifying the multicast group address and requesting that the Home Agent accept and deliver subsequently arriving packets destined to the multicast group address to the Foreign Agent.

36. A Foreign Agent that supports Mobile IP, the Foreign Agent being configured to establish a data path between the Foreign Agent and a Home Agent, the data path being adapted for transmission of multi cast IP data packets from the Home Agent to the Foreign Agent to enable the multicast IP data packets to be transmitted to one or more mobile nodes visiting the Foreign Agent, the Foreign Agent comprising:

means for receiving an information request associated with a host membership report sent from a mobile node, the host membership report specifying a multicast group address identifying a host group to which the mobile node belongs; and means for providing information identifying a Home Agent associated with the mobile node to a multicast router process in response to the information request, the information identifying the Home Agent thereby enabling the multicast router process to send a join host group message to the Home Agent, the join host group message specifying the multicast group address and requesting that the Home Agent accept and deliver subsequently arriving multicast data packets destined to the multicast group address to the Foreign Agent.

37. A Home Agent that supports Mobile IP, the Home Agent being configured to establish a data path between a Foreign Agent and the Home Agent, the data path being adapted for transmission of multicast IP data packets from the Home Agent to the Foreign Agent to enable the multicast IP data packets to be transmitted to one or more mobile nodes visiting the Foreign Agent, the Home Agent comprising:

means for receiving a join host group message, the join host group message specifying a multicast group address and requesting that the Home Agent accept and deliver subsequently arriving packets destined to the multicast group address to the Foreign Agent;

means for sending the join host group message toward a source of multicast IP data packets; and means for setting up a data path between the Home Agent and the Foreign Agent, thereby enabling packets addressed to the multicast group address to be forwarded by the Home Agent to the Foreign Agent.

38. A multicast router for establishing a data path between a Foreign Agent and a Home Agent, the data path being adapted for transmission of multicast IP data packets from the Home Agent to the Foreign Agent to enable the multicast IP data packets to be transmitted to one or more mobile nodes visiting the Foreign Agent, comprising:

means for receiving a host membership report sent from a mobile node, the host membership report specifying a multicast group address identifying a host group to which the mobile node belongs;

means for sending an information request associated with the host membership report to a Foreign Agent that the mobile node is visiting, the information request requesting information identifying a Home Agent of the mobile node;

means for receiving information identifying the Home Agent from the Foreign Agent; and means for sending a join host group message to the Home Agent, the join host group message specifying the multicast group address and requesting that the Home Agent accept and deliver subsequently arriving packets destined to the multicast group address to the Foreign Agent.

39. A multicast router for establishing a data path between a Foreign Agent and a Home Agent, the data path being adapted for transmission of multicast IP data packets from the Home Agent to the Foreign Agent to enable the multicast IP data packets to be transmitted to one or more mobile nodes visiting the Foreign Agent, comprising:

means for receiving a host membership report from a mobile node, the host membership report specifying a multicast group address identifying a host group to which the mobile node belongs;

means for sending an information request associated with the host membership report to a Foreign Agent that the mobile node is visiting, the information request asking the Foreign Agent whether the mobile node is visiting the Foreign Agent; and means for receiving information identifying a Home Agent from the Foreign Agent and sending a join host group message to the Home Agent when the mobile node is visiting the Foreign Agent, the join host group message specifying the multicast group address and requesting that the Home Agent accept and deliver subsequently arriving packets destined to the multicast group address to the Foreign Agent.

40. In a Foreign Agent that supports Mobile IP, a method of establishing a data path between the Foreign Agent and a Home Agent, the data path being adapted for transmission of multicast IP data packets from the Home Agent to the Foreign Agent to enable the multicast IP data packets to be transmitted to one or more mobile nodes visiting the Foreign Agent, comprising:

receiving an information request associated with a host membership report sent from a mobile node, the host membership report specifying a multicast group address identifying a host group to which the mobile node belongs; and providing information identifying a Home Agent associated with the mobile node to a multicast router process in response to the information request, the information identifying the Home Agent thereby enabling the multicast router process to send a join host group message to the Home Agent, the join host group message specifying the multicast group address and requesting that the Home Agent accept and deliver subsequently arriving multicast data packets destined to the multicast group address to the Foreign Agent.

41. In a Home Agent that supports Mobile IP, a method of establishing a data path between a Foreign Agent and the Home Agent, the data path being adapted for transmission of multicast IP data packets from the Home Agent to the Foreign Agent to enable the multicast IP data packets to be transmitted to one or more mobile nodes visiting the Foreign Agent, comprising:

receiving a join host group message, the join host group message specifying a multicast group address and requesting that the Home Agent accept and deliver subsequently arriving packets destined to the multicast group address to the Foreign Agent;

sending the join host group message toward a source of multicast IP data packets; and setting up a data path between the Home Agent and the Foreign Agent, thereby enabling packets addressed to the multicast group address to be forwarded by the Home Agent to the Foreign Agent.

42. In a multicast router, a method of establishing a data path between a Foreign Agent and a Home Agent, the data path being adapted for transmission of multicast IP data packets from the Home Agent to the Foreign Agent to enable the multicast IP data packets to be transmitted to one or more mobile nodes visiting the Foreign Agent, comprising:

receiving a host membership report sent from a mobile node, the host membership report specifying a multicast group address identifying a host group to which the mobile node belongs;

sending an information request associated with the host membership report to a Foreign Agent that the mobile node is visiting, the information request requesting information identifying a Home Agent of the mobile node;

receiving information identifying the Home Agent from the Foreign Agent; and sending a join host group message to the Home Agent, the join host group message specifying the multicast group address and requesting that the Home Agent accept and deliver subsequently arriving packets destined to the multicast group address to the Foreign Agent.

43. In a multicast router, a method of establishing a data path between a Foreign Agent and a Home Agent, the data path being adapted for transmission of multicast IP data packets from the Home Agent to the Foreign Agent to enable the multicast IP data packets to be transmitted to one or more mobile nodes visiting the Foreign Agent, comprising:

receiving a host membership report from a mobile node, the host membership report specifying a multicast group address identifying a host group to which the mobile node belongs;

sending an information request associated with the host membership report to a Foreign Agent that the mobile node is visiting, the information request asking the Foreign Agent whether the mobile node is visiting the Foreign Agent; and receiving information identifying a Home Agent from the Foreign Agent and sending a join host group message to the Home Agent when the mobile node is visiting the Foreign Agent, the join host group message specifying the multicast group address and requesting that the Home Agent accept and deliver subsequently arriving packets destined to the multicast group address to the Foreign Agent.

* * * * *